(12) United States Patent
Arandes Vilagrasa et al.

(10) Patent No.: US 12,741,816 B1
(45) Date of Patent: Sep. 22, 2026

(54) ROBOTIC TOOL AND PROCESS FOR PICKING OBJECTS FROM COMPARTMENTED STORAGE UNITS

(71) Applicant: Amazon Technologies, Inc., Seattle, WA (US)

(72) Inventors: Roc Arandes Vilagrasa, Berlin (DE); Can Erdogan, Berlin (DE); Johannes Kulick, Berlin (DE); Kiru Park, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 805 days.

(21) Appl. No.: 18/066,864

(22) Filed: Dec. 15, 2022

(51) Int. Cl.

| | |
|---|---|
| ***B65G 1/137*** | (2006.01) |
| ***B25J 15/06*** | (2006.01) |
| ***B65G 1/02*** | (2006.01) |
| ***B65G 47/91*** | (2006.01) |

(52) U.S. Cl.
CPC ........ *B65G 1/1375* (2013.01); *B25J 15/0616* (2013.01); *B65G 1/02* (2013.01); *B65G 1/1373* (2013.01); *B65G 47/91* (2013.01)

(58) Field of Classification Search
CPC ...... B65G 1/1375; B65G 1/02; B65G 1/1373; B65G 47/91; B25J 15/0616
See application file for complete search history.

(56) References Cited

U.S. PATENT DOCUMENTS

| | | | | |
|---|---|---|---|---|
| 3,844,092 A * | 10/1974 | Stringer | B65B 25/20 | 53/505 |
| 4,534,549 A * | 8/1985 | Eberle | H01M 10/14 | 271/103 |
| 4,712,665 A * | 12/1987 | McDonald | B65B 43/58 | 198/346.2 |
| 11,104,468 B1 * | 8/2021 | Tomasetta | B25J 11/0075 | |
| 2017/0203443 A1 * | 7/2017 | Lessing | B25J 15/10 | |

* cited by examiner

*Primary Examiner* — Ernesto A Suarez
*Assistant Examiner* — Laurence R Brothers
(74) *Attorney, Agent, or Firm* — Eversheds Sutherland (US) LLP

(57) ABSTRACT

Systems and techniques for picking an item from a container using an end effector are described. An example system includes a rack comprising a plurality of containers. Each container is configured to hold one or more items. The system also includes a robotic arm having an end effector configured to pick a target item from one of the plurality of containers. The end effector includes (i) first and second plates disposed parallel to each other and (ii) an extendable suction cup disposed between the first and second plates. The end effector is configured to extend the extendable suction cup to contact the target item, create a seal with the target item, after creating the seal, retract the extendable suction cup to remove the target item from the container, and after retracting the extendable suction cup, engage the target item between the first and second plates.

13 Claims, 15 Drawing Sheets

ROBOTIC TOOL AND PROCESS FOR PICKING OBJECTS FROM COMPARTMENTED STORAGE UNITS

BACKGROUND

Many facilities (e.g., warehouses, plants, distribution centers, storehouses, factories, etc.) perform tasks such as stowing items, picking items, shipping items, and the like. Such facilities generally use various transport devices (e.g., carts, containers, pallets, bins, etc.) to transport items to different locations inside and/or outside the facility. As an example, an item may be retrieved from storage and transported to a location in preparation for stowing in a container. In another example, an item can be retrieved (or picked) from a container in preparation for shipping.

Items in a facility are typically stowed in containers and then retrieved a later time to fulfill a customer's order. Items may be stowed and/or retrieved randomly, such that the containers may contain many different types of items that have many different sizes. Further, the items may be arranged differently in each container. Because of the wide variety of items being stowed and retrieved, it is difficult to design an end effector (or end of arm tool) for a robotic arm that can reliably retrieve an item from a container that may already have many different types of items.

DETAILED DESCRIPTION

Inventory systems are utilized by many entities for storing and managing inventory. For example, some retailers may utilize a warehouse of racks that store items in various containers (also referred to as bins, storage locations, etc.). Items may be stowed in the various containers to hold the item in preparation for picking. For example, when an order for a specific item needs to be fulfilled by a retailer, the item can be picked (or retrieved) from the container where the item is stored. As used herein, an "item" may refer to an individual item, a package containing an individual item, or a package containing multiple items.

Inventory systems according to one embodiment described herein use a mechanical system to pick an item from a container. In one embodiment, the mechanical system includes a robotic arm that permits various sensors and end effectors (also referred to as end of arm tools (EOATs)) to interact with an item(s) within one or more containers. For example, the containers may be supported by a rack (also referred to as an inventory holder or a rack of shelves) and each container may have any number of items. The robotic arm can use its end effector to retrieve an item within a container and transport the item to another location.

In embodiments described herein, the robotic arm uses an end effector that can retrieve an item within a densely packed container where multiple items may be in contact. In one particular embodiment, the end effector includes two plates and an extendable suction cup, each of which is configured to interact with an item. The end effector uses the extendable suction cup to contact a target item from a container. For example, the extendable suction cup is extended towards the item until the extendable suction cup contacts the target item. After contact is made with the target item, the end effector uses a vacuum to create a vacuum seal (e.g., negative pressure) that holds the item on the end effector.

With the target item engaged with the vacuum seal, the extendable suction cup is then retracted to remove the item from the container. After the target item is removed from the container, the end effector uses the plates to engage (e.g., squeeze) the target item held by the extendable suction cup. For example, the end effector can engage the target item by squeezing the target item between the plates. Each plate can be independently actuated and moved translationally in order to engage the target item. By engaging the target item with the two plates in addition to the vacuum seal, the end effector described herein can significantly reduce the likelihood of dropping the target item due to, for example, poor sealing or other external forces, when the target item is being moved or placed at a new location.

Figure 1:
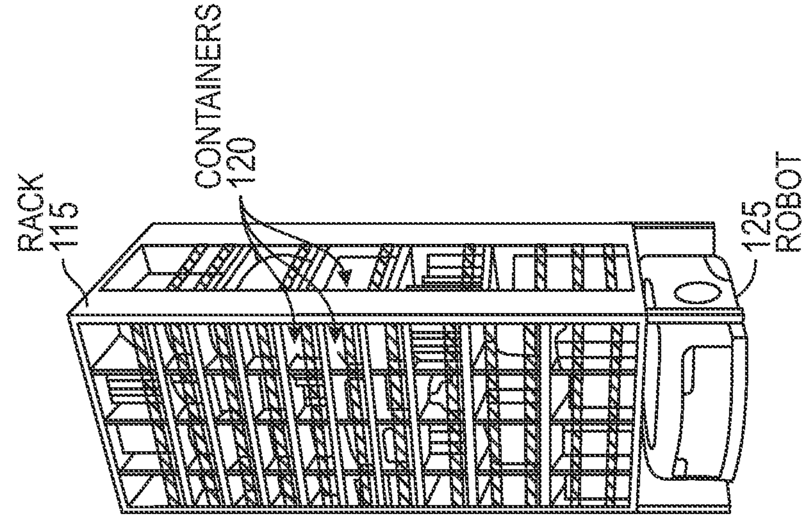
FIG. 1 illustrates an example system, according to one embodiment.
Figure 1:
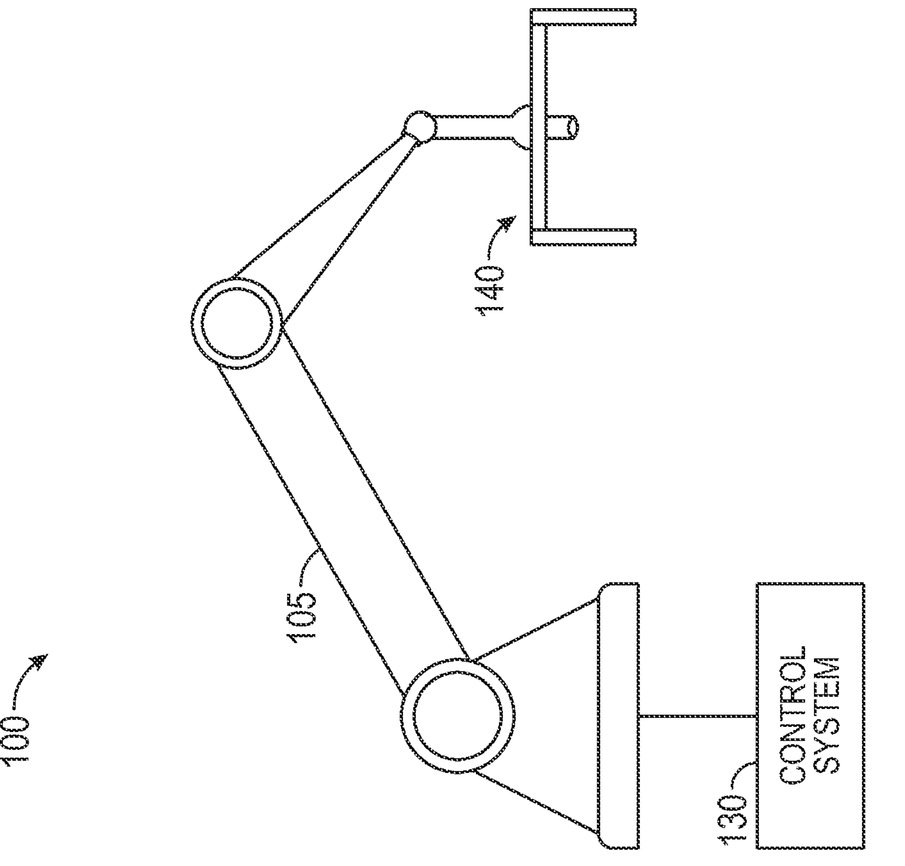

FIG. 1 illustrates an example system 100, according to one embodiment. The system 100 may be located in a facility (e.g., warehouse, factory, distribution center, etc.). In one particular embodiment, the system 100 is a robotic picking system. For example, such a robotic picking system can be located in a fulfillment center that performs various operations in order to ship items to customers.

Here, the system 100 includes a rack 115 (also referred to as an inventory holder) that includes multiple containers 120 and a robot 125 that can pick up and move the rack 115 to a particular (e.g., desired) location. The system 100 also includes a robotic arm 105 that can access the containers on the rack 15, e.g., for a robotic picking operation. The rack 115 can have containers on multiple sides which can be accessed via the robot 125 spinning the rack 115 so that each side of the rack 115 can face the robotic arm 105 on a different robotic arm(s) (not shown). In one embodiment, the robot 125 can move the rack 115 to a position proximate to the robotic arm 105, e.g., to enable the robotic arm 105 to pick items from the containers 120. In another embodiment, the robotic arm 105 is mobile and the racks 115 are stationary. In this embodiment, the robotic arm 105 may move between the racks to perform pick operations.

In the embodiment depicted in FIG. 1, the robotic arm 105 supports an end effector 140 for picking items from the containers 120. As discussed in more detail below, the end effector 140 can include an extendable suction cup which can extend to contact a target item within a container 120. When a seal is made with the extendable suction cup, the extendable suction cup can retract to remove the target item from the container 120. The end effector 140 may also include two plates which can engage the target item by squeezing the target item between the plates. Once the target item is engaged by the two plates, the robotic arm 105 may transition the target item to a desired location and place the target item.

The system 100 also includes a control system 130 that controls the robotic arm 105 and the end effector 140. Different implementations of the control system 130 are discussed in FIG. 7. In any case, the control system 130 can control movement of the robotic arm 130 and/or end effector 140 using any number of sensors, computer vision systems, radar, Lidar, or other sensing systems associated with operating the robotic arm 105 and/or end effector 140. The control system 130 can also control operation of the end effector 140 by at least one of: (i) extending/retracting the extendable suction cup, (ii) activating/deactivating the seal formed using the extendable suction cup, or (iii) controlling movement of each plate to engage/disengage an item. FIGS. 6A-6E illustrate an example of using an end effector 140 to pick an item from a container.

Figure 2:
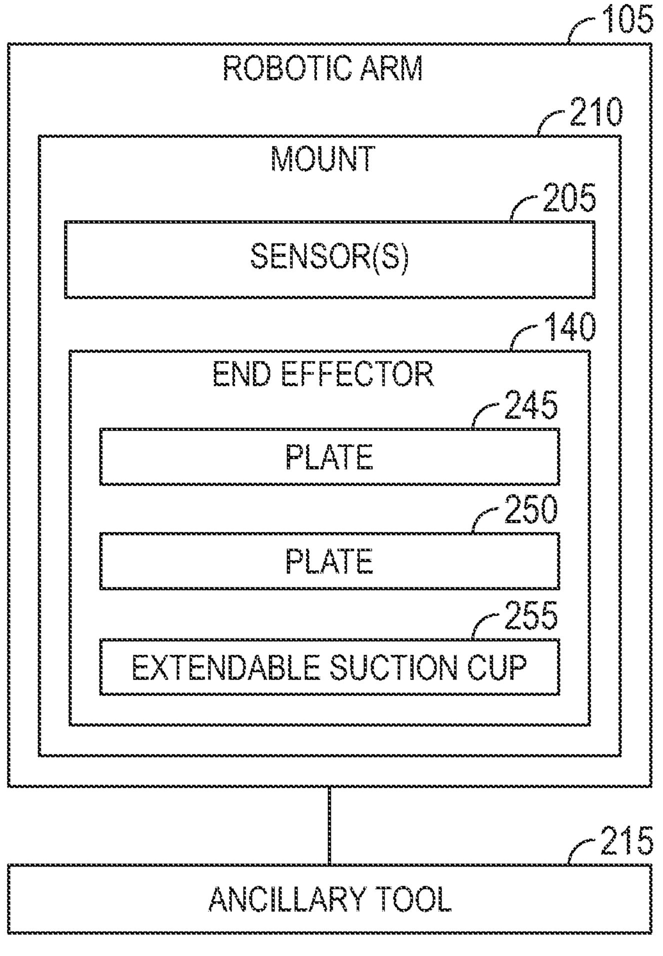
FIG. 2 is a block diagram of a robotic arm, according to one embodiment.

FIG. 2 is a block diagram of the robotic arm 105, according to one embodiment. The robotic arm 105 may support various components used for a robotic picking operation. Here, for example, the robotic arm 105 includes a mount 210, which supports one or more sensors 205 and an end effector 140.

The sensor(s) 205 may be a visual sensor, depth sensor, infrared sensor, barcode reader, force sensing sensor, pressure sensor, gyroscope, accelerometer, or combinations thereof. The sensor(s) 205 can be any sensor that permits the control system 130 to identify arrangement of items in a container 120, identify the type and/or number of items in the container 120, identify an individual item in the container 120, determine an amount of suction force applied to an item, determine an amount of squeeze force applied to an item, determine an orientation of the end effector 140, and the like. Note that while FIG. 2 depicts the sensor(s) 205 being disposed on the mount 210, the sensor(s) 205 can be disposed elsewhere on the robotic arm 105 and/or within an environment in which the robotic arm 105 is located.

The end effector 140 includes an extendable suction cup 255. The extendable suction cup 255 includes a shaft that extends from the end effector 140 where a distal end of the shaft includes a suction cup element for contacting an item. In one embodiment, the extension and retraction of the extendable suction cup 255 is pneumatically controlled. For example, the end effector 140 may use pneumatic pressure (e.g., via compressed air) to extend and retract the shaft. In one embodiment, the end effector 140 is also attached to a vacuum source (not shown). For example, the vacuum source may create a vacuum (e.g., negative pressure) within the shaft to hold an item to the suction cup element.

The end effector 140 also includes two plates 245, 250, which are parallel to each other. Each plate 245, 250 can be independently controlled via a separate motor. For example, each plate 245, 250 can be moved independently with respect to each other. The end effector 140 may control the plates 245, 250 to grasp an item that is engaged with the extendable suction cup 255, for example, by squeezing the item between the plates 245, 250. The end effector 140 is discussed in greater detail below with respect to FIGS. 3A-3E.

In addition to the components of the robotic arm 105, the system 100 can include an ancillary tool 215 that supports the operations performed by the robotic arm 105. For example, one of the sensors 205 may instead be attached to the ancillary tool 215. In another example, the ancillary tool 215 may include a vacuum source for creating a vacuum within the end effector 140 and/or a pneumatic source for providing compressed or pressurized air. In yet another example, the ancillary tool 215 may be a conveyor belt that moves items to or from the robotic arm 105. For example, when doing a pick operation, after the end effector 140 retrieves the item from a container, the robotic arm 105 can move the end effector 140 to an unloading zone where the item is placed on the conveyor belt and moved to a different portion of a facility (e.g., fulfillment center).

In one embodiment, the mount 210 which supports the end effector 140 is capable of rotating 360 degrees) (°). For example, the end effector 140 may be mounted on a joint of the robotic arm 105 that rotates 360°. In this embodiment, the robotic arm 105 can rotate the end effector 140 so that the plates 245, 250 are aligned with a target item in a container. For example, assuming a target item is at a 45° inclination within the container, the robotic arm 105 can rotate the end effector 140 45° to match the orientation of the target item.

Figure 3A:
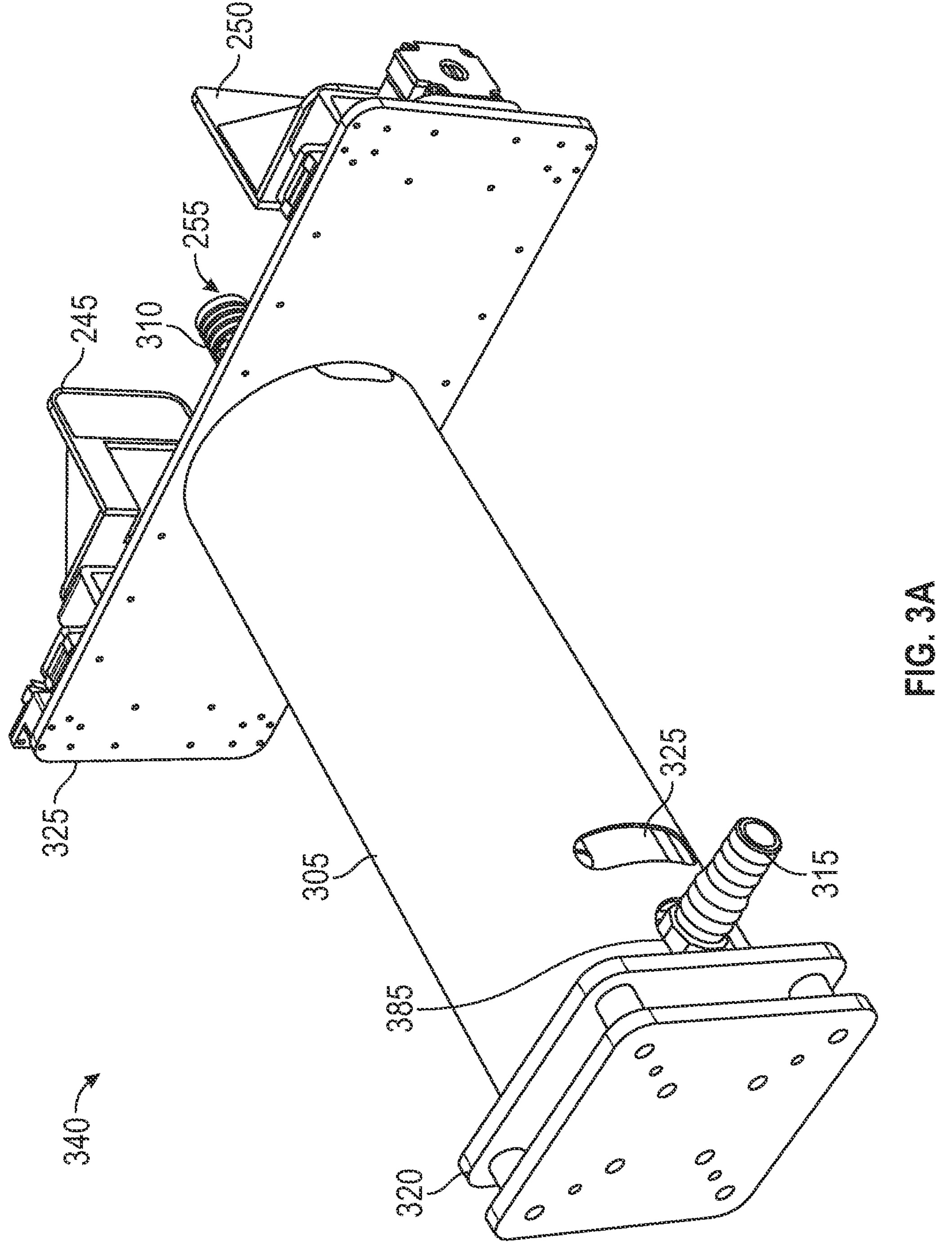
FIGS. 3A-E illustrate different views of an example end effector, according to one embodiment.
Figure 3B:
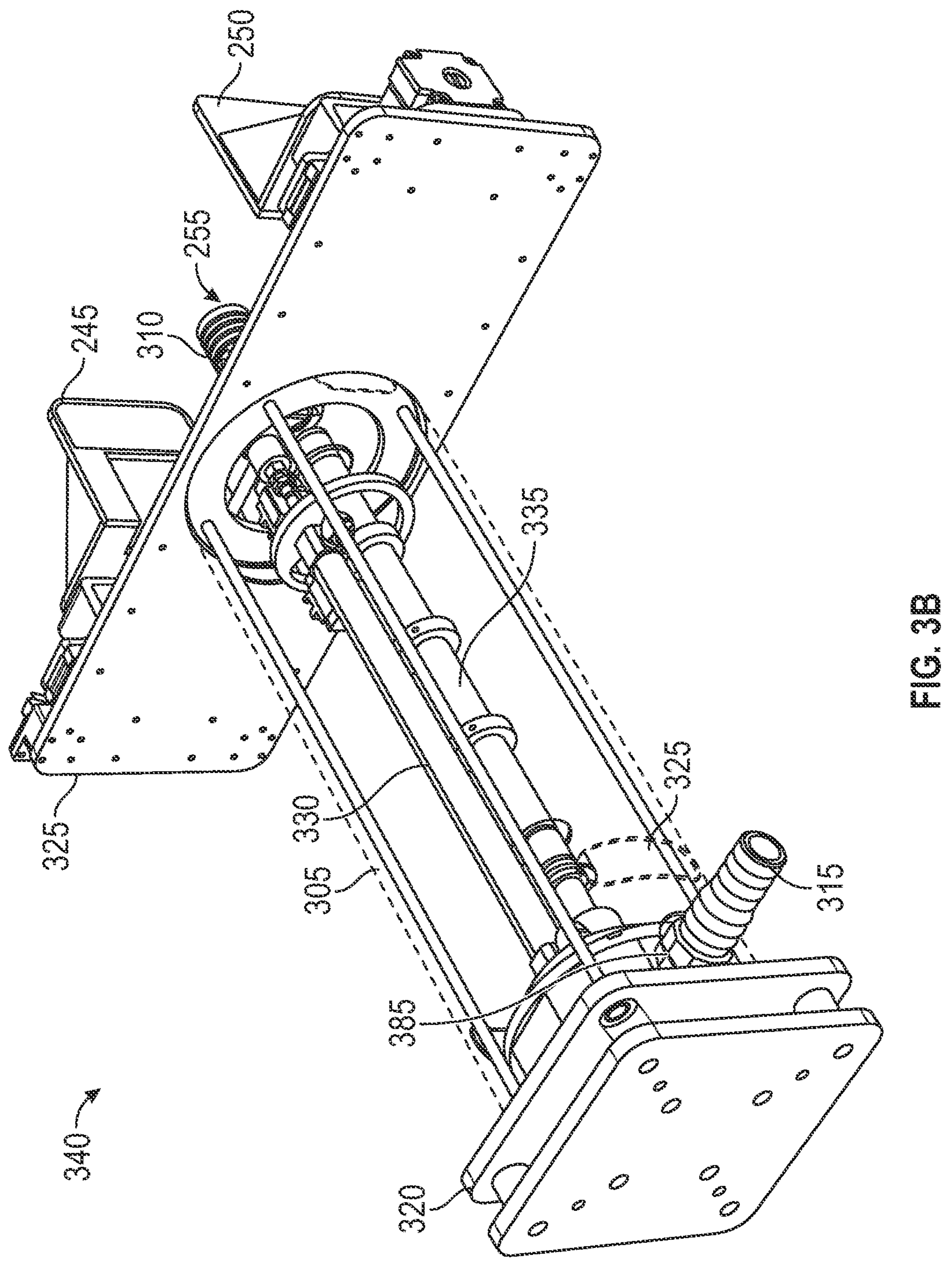
Figure 3C:
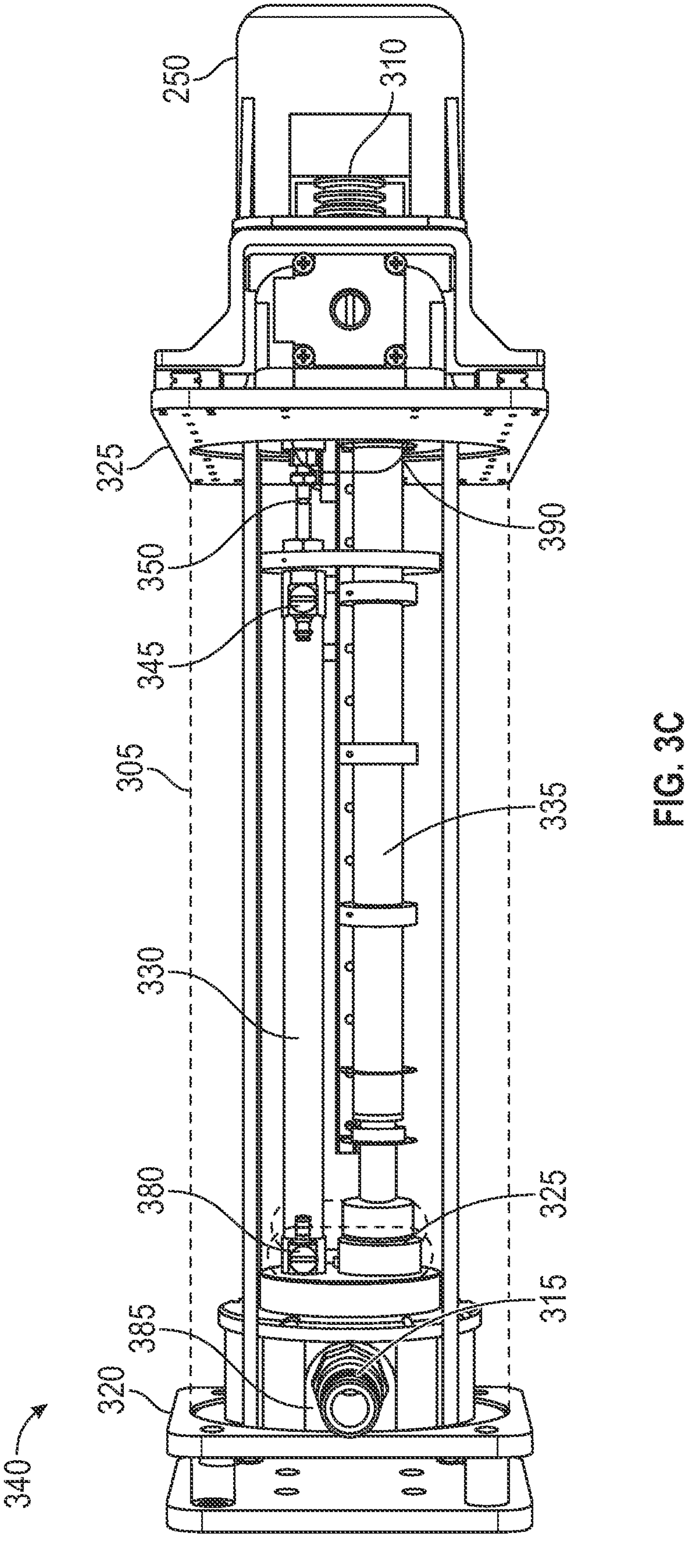
Figure 3D:
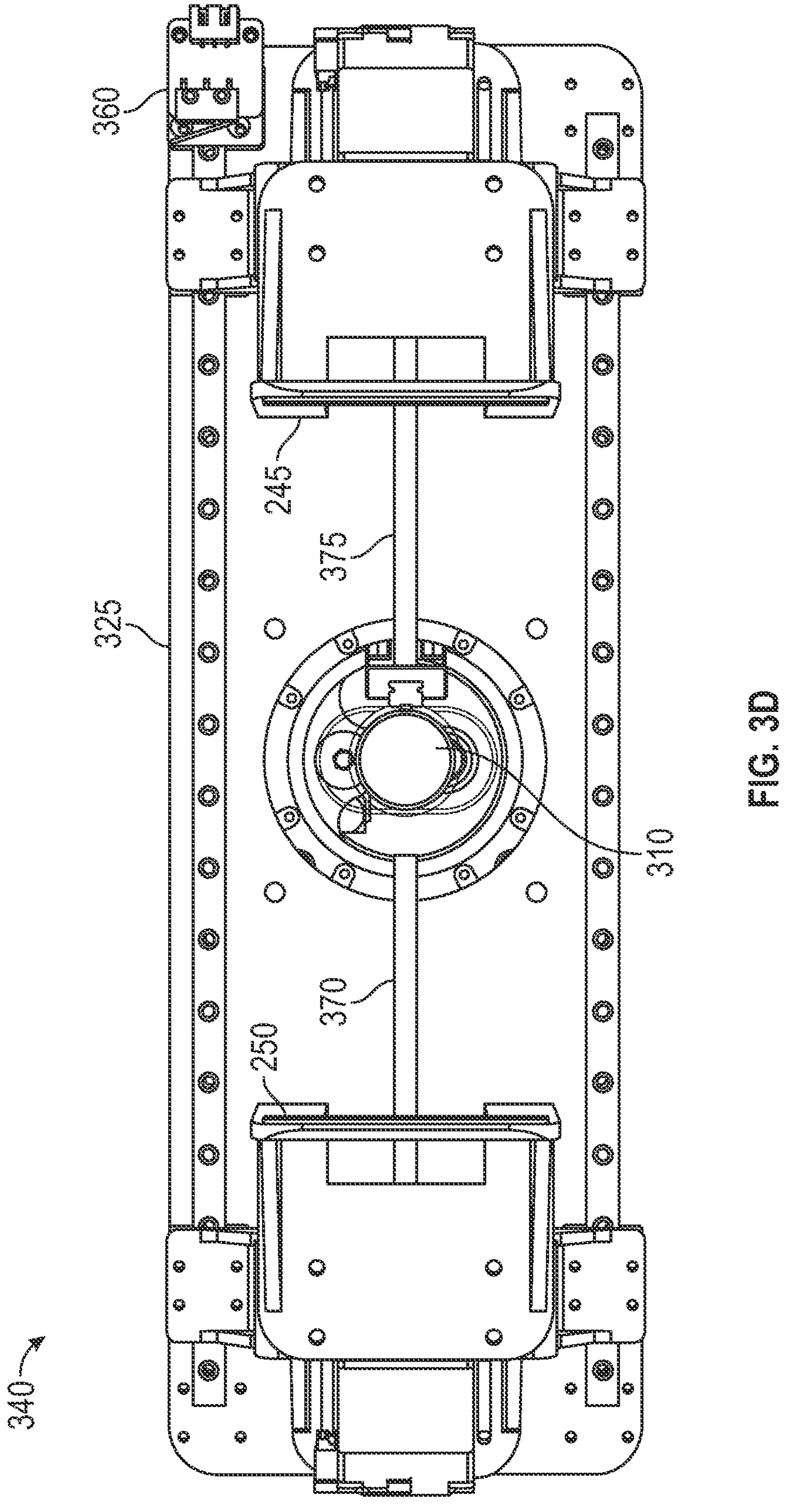
Figure 3E:
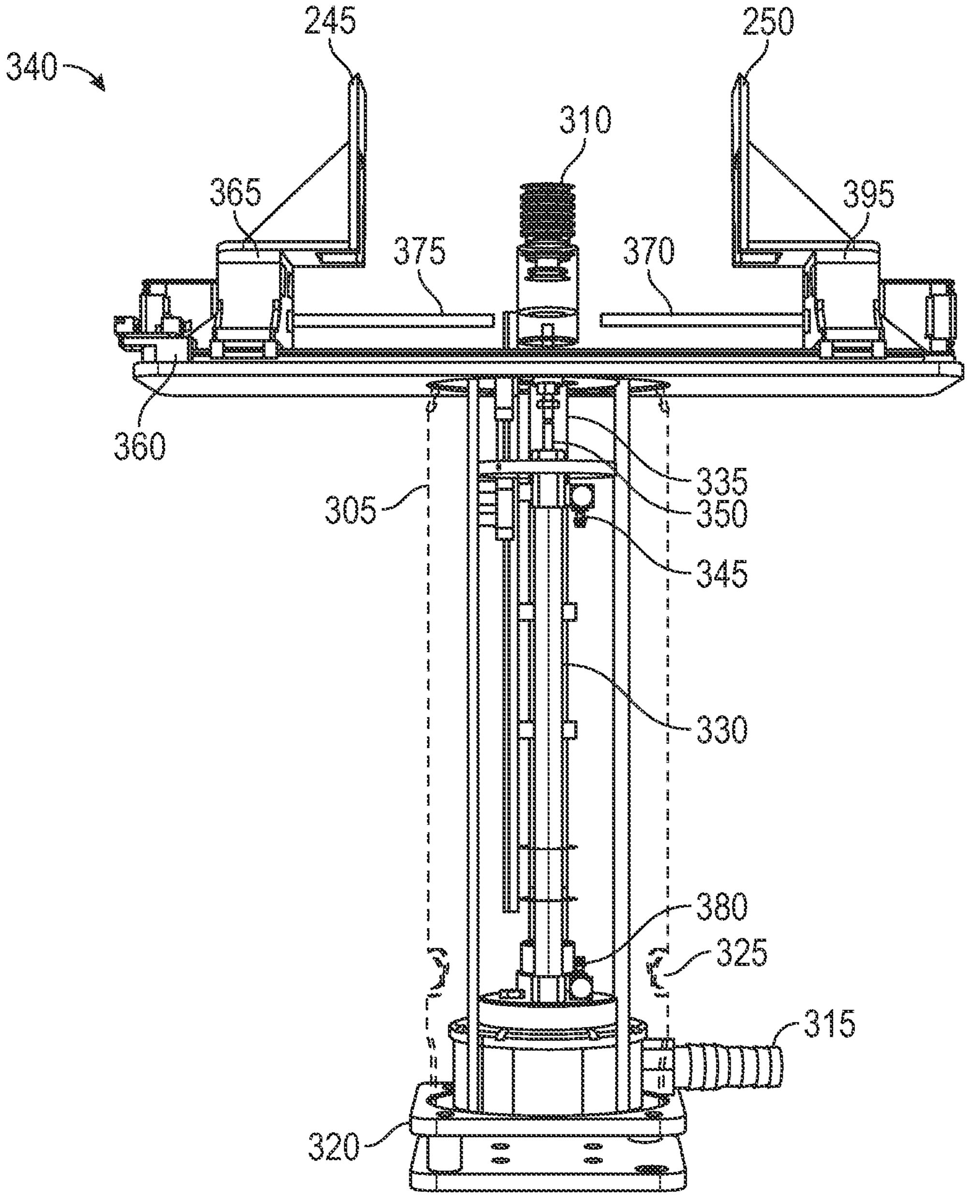

FIGS. 3A-3E illustrate different views of an example end effector 340, according to one embodiment. In particular, FIG. 3A illustrates a perspective view of the end effector 340, FIG. 3B illustrates another perspective view of the end effector 340, FIG. 3C illustrates a side view of the end effector 340, FIG. 3D illustrates a front view of the end effector 340, and FIG. 3E illustrates a top view of the end effector 340, according to one embodiment. The end effector 340 described in FIGS. 3A-3E is one implementation of the end effector 140 described in FIGS. 1 and 2.

The end effector 340 includes a shell 305, an end member 320, and an end member 325. A first end of the shell 305 is attached to the end member 320 and a second (opposite) end of the shell 305 is attached to the end member 325. The shell 305 at least partially encloses the extendable suction cup 255. The end effector 340 includes a vacuum input 315, which extends through an inlet 385 of the shell 305. The vacuum input 315 is coupled to a shaft 335, where a distal end of the shaft 335 is connected to a suction cup element 310. The shaft 335 is a telescopic shaft, such that the shaft 335 can be extended in a direction away from the end member 320 and retracted back towards the end member 320.

The vacuum input 315 allows for connecting the extendable suction cup 255 to a vacuum source to create a vacuum (e.g., negative pressure) within the interior of the shaft 335. For example, when the vacuum source is activated, air can be pulled from the distal end of the shaft 335 connected to the suction cup element 310, through the shaft 335, and out the vacuum input 315. The activation of the vacuum source allows the suction cup element 310 to create a seal when in contact with a given item.

The extendable suction cup 255 also includes a casing 330, which includes a piston 350. A distal end of the piston 350 is connected to the suction cup element 310. The piston 350 can slide through the casing 330 to move from a retracted position to an extended position. The movement (e.g., extension/retraction) of the piston 350 is pneumatically actuated. For example, the casing 330 includes a pressure inlet 380 and a pressure inlet 345, each of which can be connected to a separate hose (not shown) to allow pressurized air to enter the respective pressure inlet. Here, the piston 350 is extended pneumatically when pressurized air is forced into the pressure inlet 380. The piston 350 may then be retracted pneumatically (from its extended position) when pressurized air is forced into the pressure inlet 345 (and pressurized air into the pressure inlet 380 is stopped).

The movement of the piston 350 may control the movement of the shaft 335. For example, the shaft 335 is extended when the piston 350 is extended pneumatically, and the shaft 335 is retracted when the piston 350 is retracted pneumatically. In this manner, the pneumatic actuation of the piston 350 allows the extendable suction cup 255 to interact with an item in a container.

As shown in FIGS. 3D and 3E, the end effector 340 also includes a plate 245 and a plate 250, which are parallel to each other. The plate 245 is controlled via a motor 365 and the plate 250 is controlled via a motor 395. In one embodiment, the motors 365 and 395 are direct current (DC) stepper motors. The motor 365 is coupled to a shaft 375 and is configured to move the plate 245 in a direction along the shaft 375. Similarly, the motor 395 is coupled to a shaft 395 and is configured to move the plate 250 in a direction along the shaft 395. Thus, the motors 365, 375 can be controlled to move the plates 245, 250, respectively, towards each other or away from each other in order to engage an item. The end effector 340 also includes a sensor 360, which is used as a homing sensor for the plates 245 and 250. For example, the sensor 360 can be used to move the plates 245, 250 to a reference position.

Figure 4:
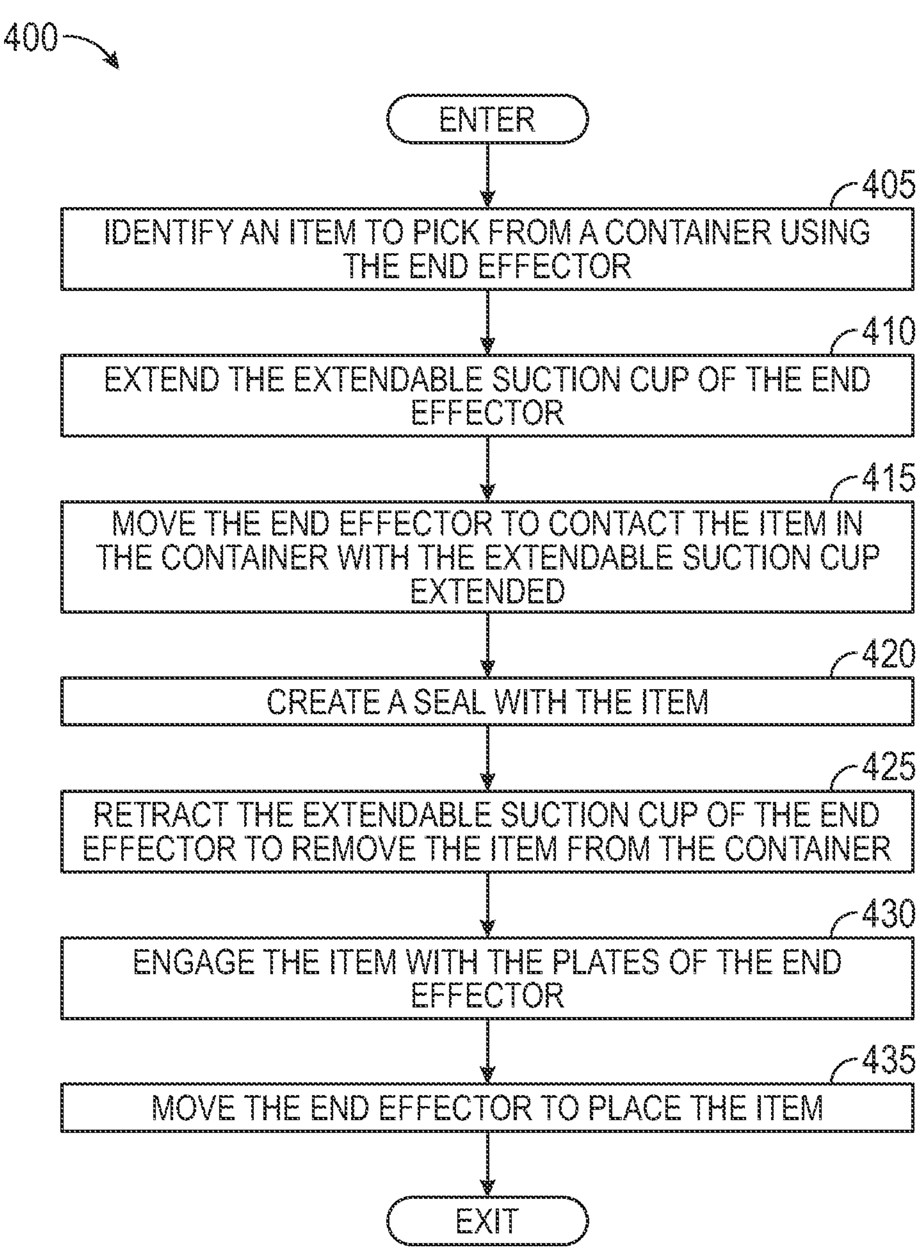
FIG. 4 is a flowchart of a method for using an end effector to pick an item from a container, according to one embodiment.

FIG. 4 is a flowchart of a method 400 for using an end effector (e.g., end effector 140) to pick an item from a container (e.g., container 120), according to one embodiment. The method 400 may be performed by a control system (e.g., control system 130).

Figure 6A:
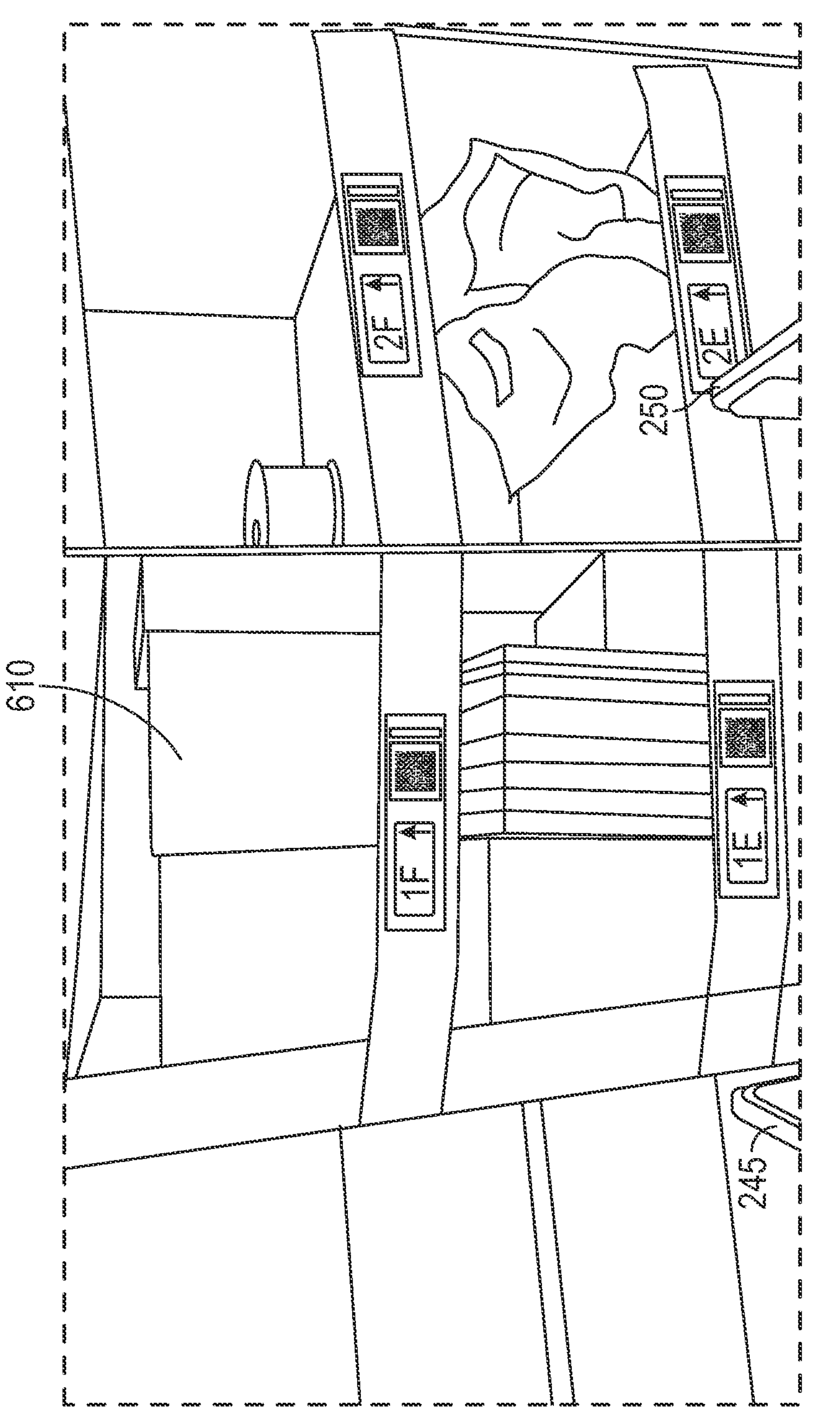
FIGS. 6A-6E illustrate an example scenario of using an end effector to pick an item from a container, according to one embodiment.

Method 400 enters at block 405, where the control system identifies an item to pick up from a container using the end effector. For example, the control system may include, or be in communication with, a computer vision system that identifies items in a container, determines an arrangement of the items in the container, and determines the location of the items relative to the end effector. FIG. 6A illustrates a reference example in which an item 610 is identified within a container, according to one embodiment.

Initially, the end effector may be in an unactuated state, where the extendable suction cup is retracted and the plates (e.g., plates 245, 250) are separated, e.g., as shown in FIG. 6A. The unactuated state may be the rest state of the end effector when not currently being used in a pick operation.

Figure 6B:
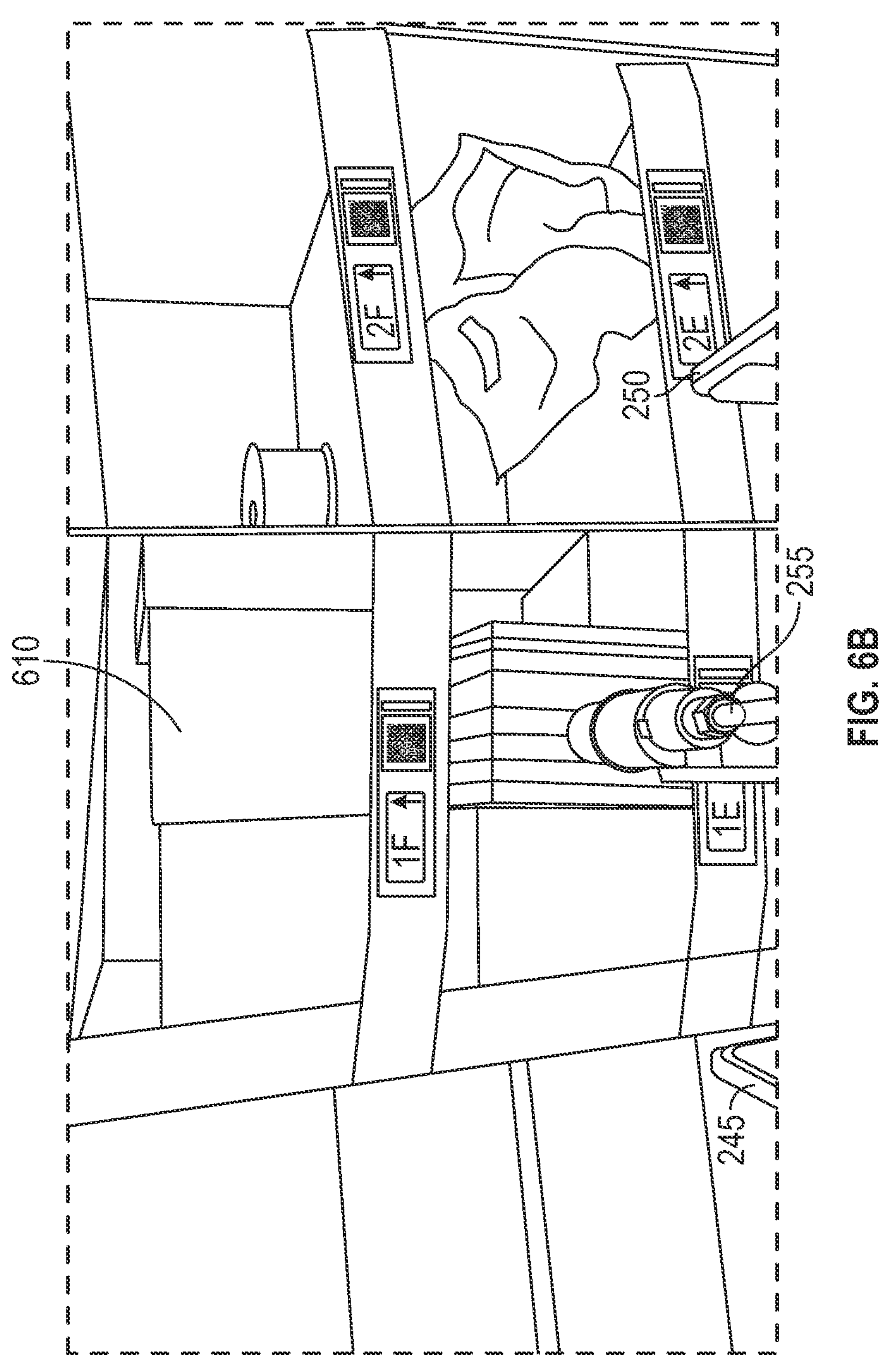

At block 410, the control system extends the extendable suction cup (e.g., extendable suction cup 255) of the end effector. For example, the control system can activate a pneumatic system that provides pressurized air to a first pressure inlet (e.g., pressure inlet 380), which then extends a piston (e.g., piston 350) of the extendable suction cup. Note that block 410 can occur before or after the control system identifies an item at block 405. For example, the control system may keep the end effector in the actuated state, or the control system may wait until it identifies an item before extending the extendable suction cup. FIG. 6B illustrates a reference example of the end effector with the extendable suction cup extended, according to one embodiment.

Figure 6C:
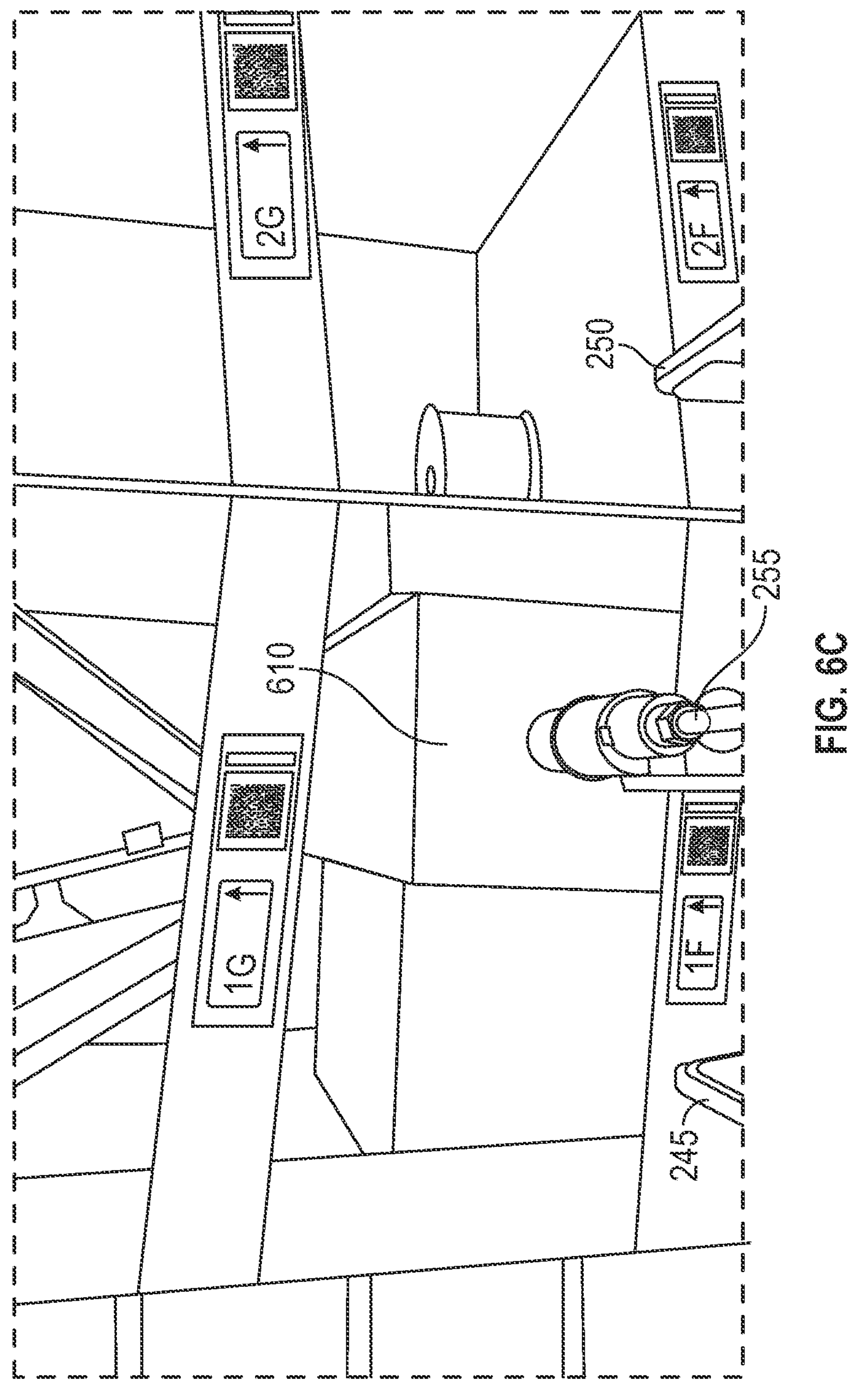

At block 415, the control system moves the end effector to contact an item in the container with the extendable suction cup extended. FIG. 6C illustrates a reference example of the end effector being moved to contact the item 610, according to one embodiment. In one embodiment, the control system can use a computer vision system, radar, Lidar, or other sensors to move the end effector to the item. In one embodiment, the end effector is disposed on a robotic arm. In this embodiment, the control system may control the robotic arm to adjust an orientation of the end effector in order to align the end effector with an orientation of the item 610. For example, if the item 610 is at X degrees inclination, the control system may control the robotic arm to rotate the end effector X degrees. In other embodiments, the end effector may be disposed on other types of actuators, such as a lift or an autonomous vehicle or cart.

At block 420, the control system creates a seal with the item using the extendable suction cup. In one embodiment, the control system may activate a vacuum source connected to a vacuum input (e.g., vacuum input 315) of the end effector in order to create a vacuum within a shaft (e.g., shaft 335) connected to a suction cup element (e.g., suction cup element 310) of the extendable suction cup. In one embodiment, the vacuum source may be activated before the end effector comes in contact with the item. In another embodiment, the control system activates the vacuum source after determining the end effector has come in contact with the item.

Figure 6D:
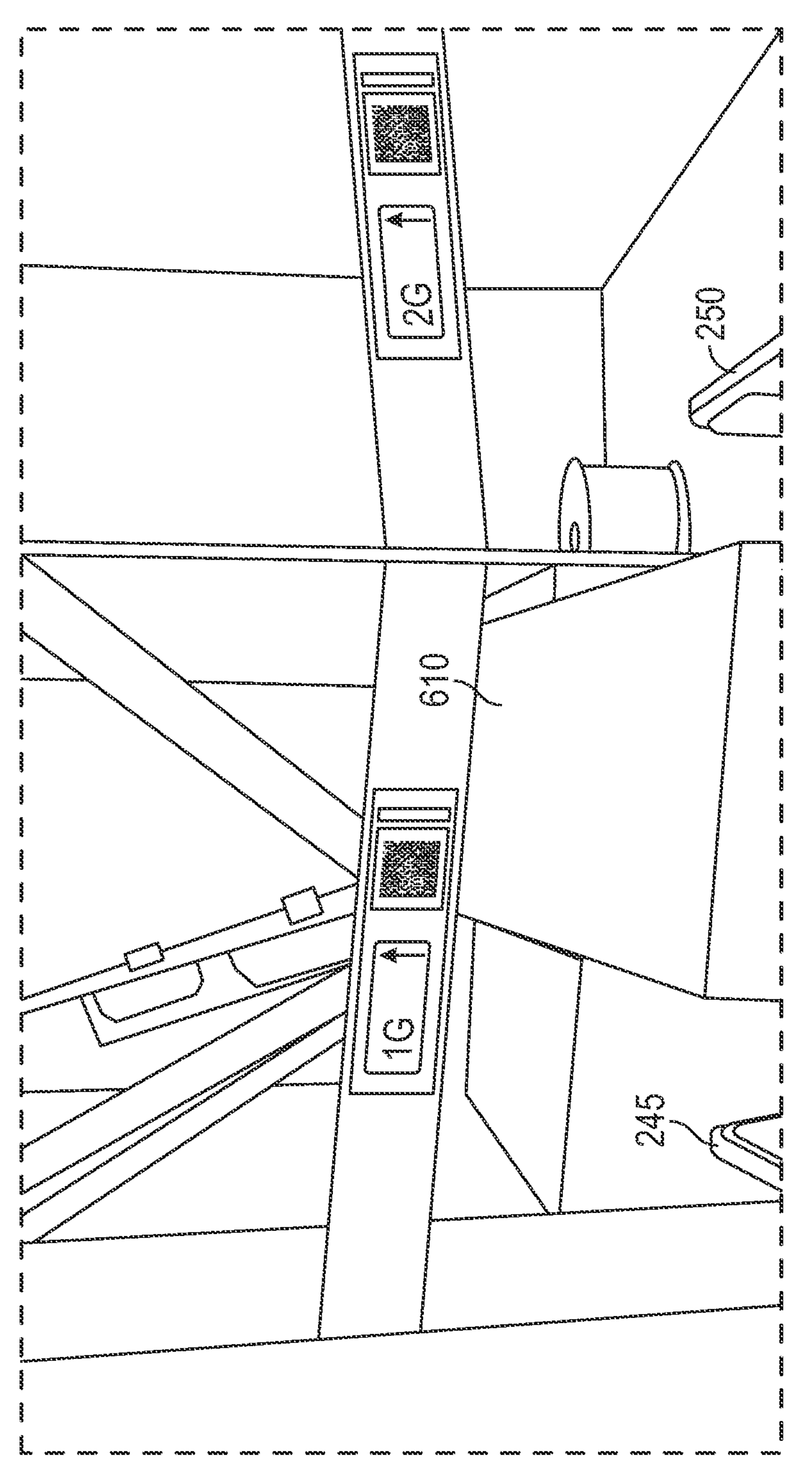

At block 425, the control system retracts the extendable suction cup of the end effector to remove the item from the container. For example, the control system can trigger the pneumatic system to provide pressurized air to a second pressure inlet (e.g., pressure inlet 345), which then retracts the piston of the extendable suction cup and to stop providing pressurized air via the first pressure inlet. FIG. 6D illustrates a reference example of the extendable suction cup of the end effector being retracted, according to one embodiment.

Figure 6E:
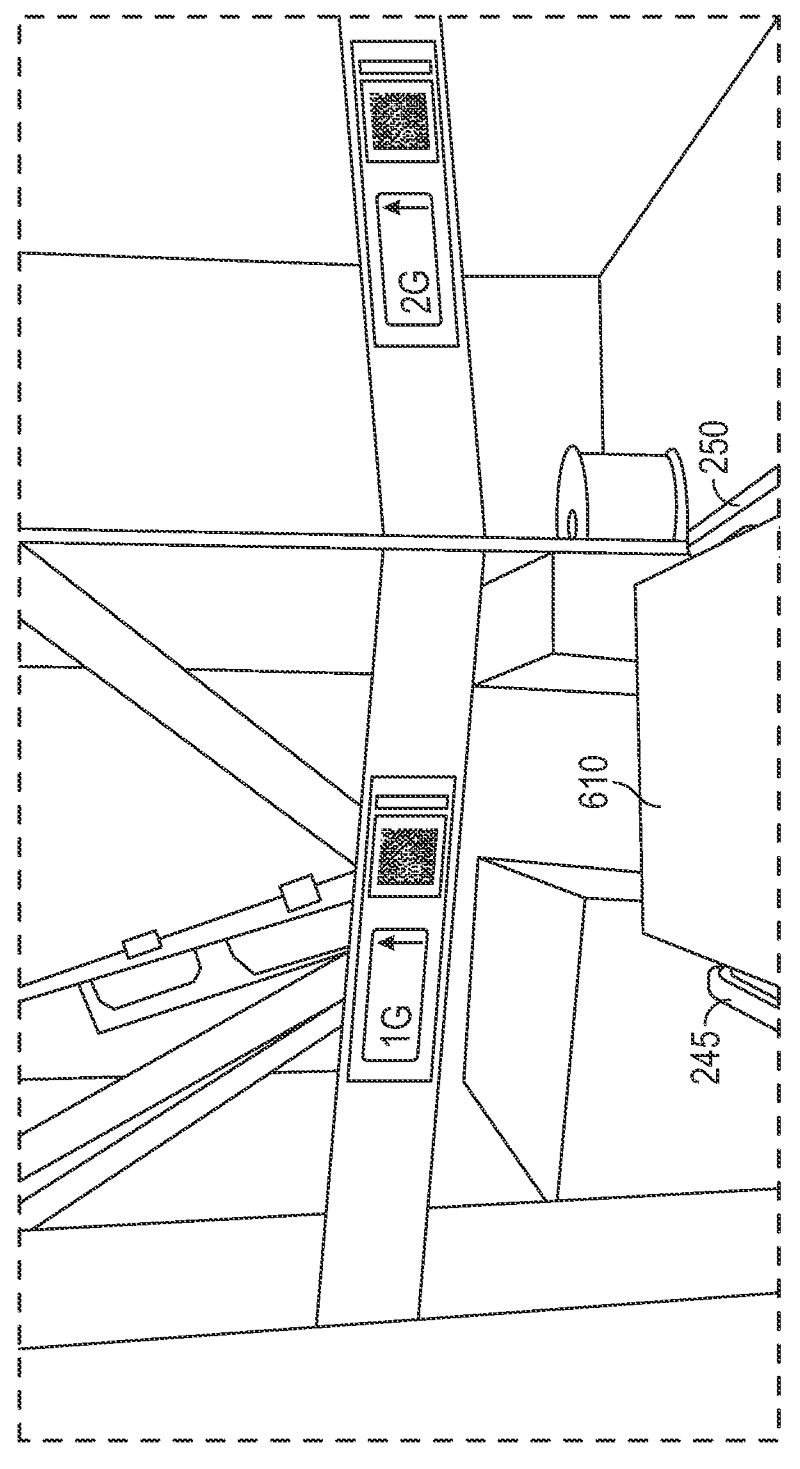

At block 430, the control system controls the end effector to engage the item with the plates of the end effector. For example, the control system can engage the item by squeezing the item between the plates. FIG. 6E illustrates a reference example of the item 610 being engaged by the plates of the end effector, according to one embodiment. At block 435, the control system moves the end effector to place the item in a desired location. The method 400 may then exit.

Figure 5:
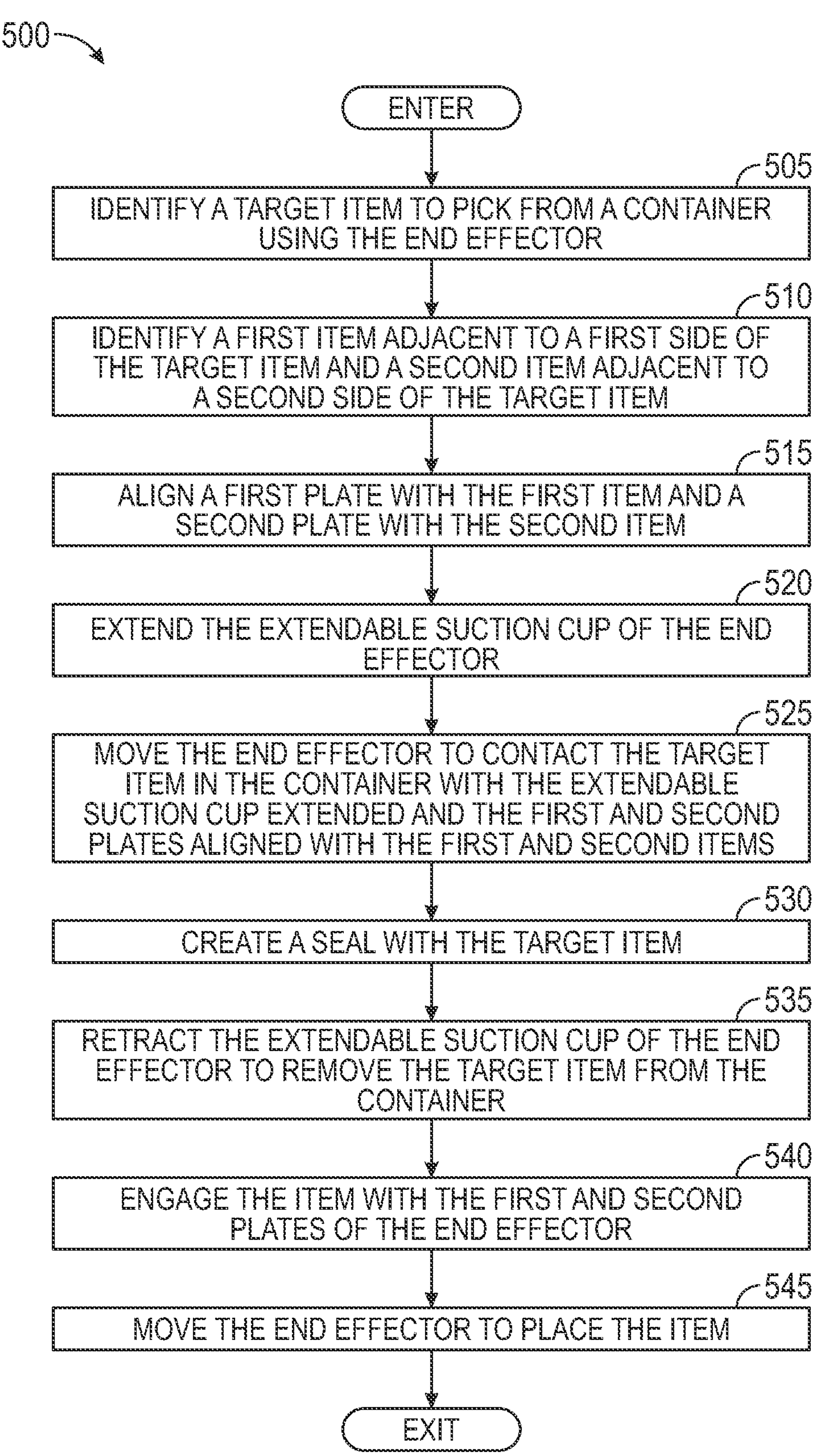
FIG. 5 is a flowchart of another method for using an end effector to pick an item from a container, according to one embodiment.

FIG. 5 is a flowchart of another method 500 for using an end effector (e.g., end effector 140) to pick an item from a container (e.g., container 120), according to one embodiment. The method 500 may be performed by a control system (e.g., control system 130).

Method 500 enters at block 505, where the control system identifies a target item to pick up from a container using the end effector. For example, the control system may include, or be in communication with, a computer vision system that identifies items in a container, determines an arrangement of the items in the container, and determines the location of the items relative to the end effector.

Initially, the end effector may be in an unactuated state, where the extendable suction cup is retracted and the plates (e.g., plates 245, 250) are separated. The unactuated state may be the rest state of the end effector when not currently being used in a pick operation.

At block 510, the control system identifies a first item adjacent to a first side of the target item and a second item adjacent to a second side of the target item in the container. For example, the control system can use the computer vision system to identify the first and second items.

At block 515, the control system aligns a first plate (e.g., plate 245) with the first item and a second plate (e.g., plate 250) with the second item. For example, the control system may move the first plate to a position of the first item using a first motor (e.g., motor 365), and may move the second plate to a position of the second item using a second motor (e.g., motor 395).

At block 520, the control system extends the extendable suction cup (e.g., extendable suction cup 255) of the end effector. For example, the control system can activate a pneumatic system that provides pressurized air to a first pressure inlet (e.g., pressure inlet 380), which then extends a piston (e.g., piston 350) of the extendable suction cup.

At block 525, the control system moves the end effector to contact the target item in the container with the extendable suction cup extended and the first and second plates aligned with the first and second items. In one embodiment, the control system can use a computer vision system, radar, Lidar, or other sensors to move the end effector to the target item. In one embodiment, the end effector is disposed on a robotic arm. In this embodiment, the control system may control the robotic arm to adjust an orientation of the end effector in order to align the end effector with an orientation of the item 610. For example, if the item 610 is at X degrees inclination, the control system may control the robotic arm to rotate the end effector X degrees. In other embodiments, the end effector may be disposed on other types of actuators, such as a lift or an autonomous vehicle or cart.

At block 530, the control system creates a seal with the target item using the extendable suction cup. In one embodiment, the control system may activate a vacuum source connected to a vacuum input (e.g., vacuum input 315) of the end effector in order to create a vacuum within a shaft (e.g., shaft 335) connected to a suction cup element (e.g., suction cup element 310) of the extendable suction cup. In one embodiment, the vacuum source may be activated before the end effector comes in contact with the target item. In another embodiment, the control system activates the vacuum source after determining the end effector has come in contact with the target item.

At block 535, the control system retracts the extendable suction cup of the end effector to remove the item from the container. For example, the control system can trigger the pneumatic system to provide pressurized air to a second pressure inlet (e.g., pressure inlet 345), which then retracts the piston of the extendable suction cup and to stop providing pressurized air via the first pressure inlet. The control system retracts the extendable suction cup while the first and second plates are aligned with the first and second items. By aligning the first and second plates with the first and second items in this manner, end effector can prevent the first and second items from being removed from the container when the extendable suction cup is retracted.

At block 540, the control system controls the end effector to engage the target item with the first and second plates of the end effector. For example, the control system can engage the target item by squeezing the target item between the first and second plates. At block 545, the control system moves the end effector to place the target item in a desired location. The method 500 may then exit.

Note the method 400 depicted in FIG. 4 and the method 500 depicted in FIG. 5 are provided as reference example methods for using an end effector 140 to pick an item from a container. For example, in some alternative implementations, the functions/operations noted in the blocks 405, 410, 415, 420, 425, 430, and/or 435 may occur out of the order noted in FIG. 4, may be skipped, may occur substantially concurrently, executed in the reverse order, or a combination thereof, depending on the particular scenario and functionality involved. Similarly, in some alternative implementations, the functions/operations noted in the blocks 505, 510, 515, 520, 525, 530, 535, 540, and/or 545 may occur out of the order noted in FIG. 5, may be skipped, may occur substantially concurrently, executed in the reverse order, or a combination thereof, depending on the particular scenario and functionality involved.

In general, it should be noted that the end effector 140 described herein can interact with one or more items in various different manners. For example, each of the plates 245 and 250 and the extendable suction cup 255 can be independently controlled in order to interact with one or more items in various different manners. For example, in one embodiment, the end effector 140 may interact with a target item using solely the extendable suction cup 255 (e.g., without the plates 245, 250). In another embodiment, the end effector 140 may interact with a target item using at least one of the plates 245 or 250 without using the extendable suction cup 255. In yet another embodiment, the end effector 140 may be used to rearrange one or more existing items in a container that are adjacent to a target item.

Figure 7:
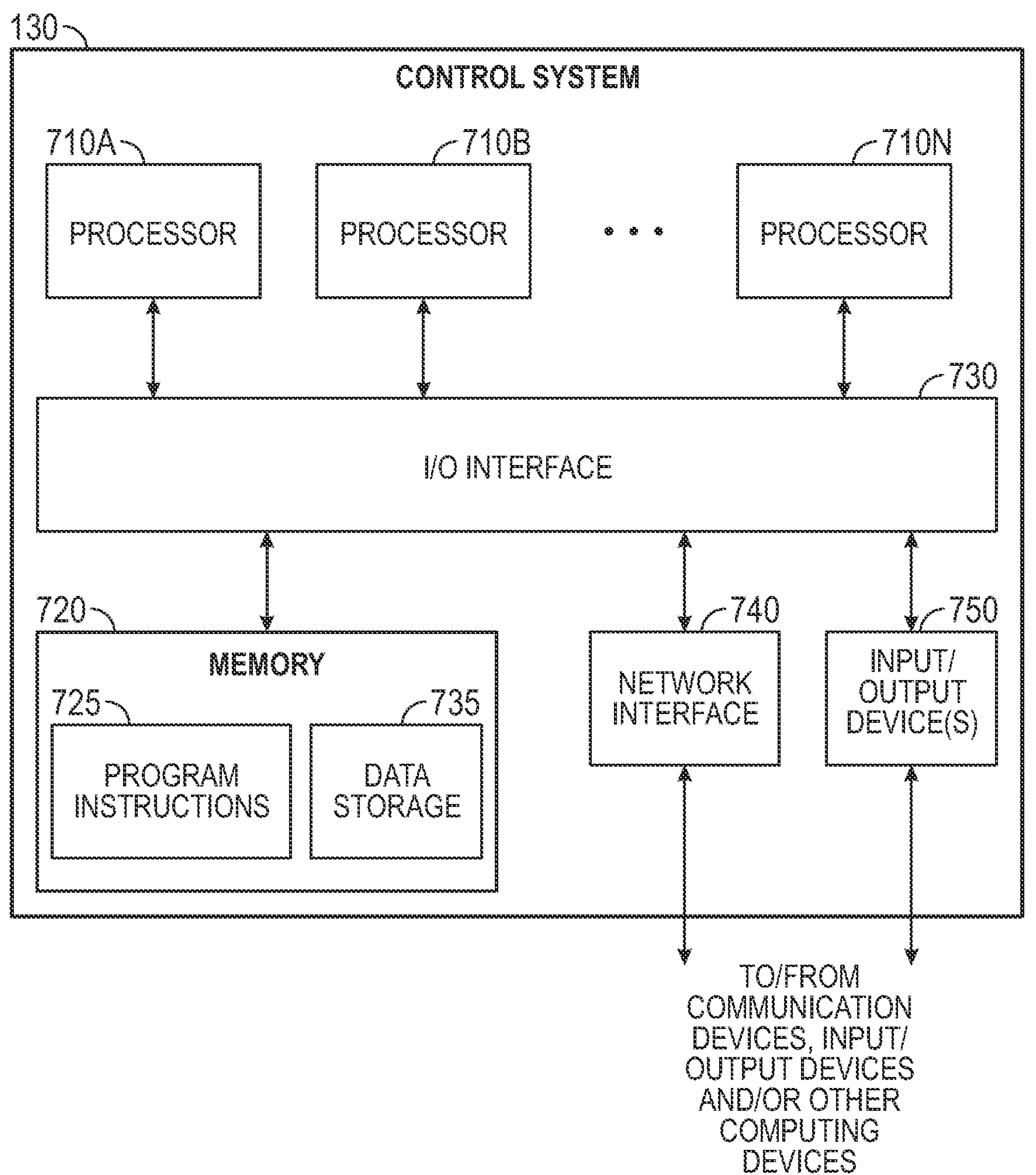
FIG. 7 is a block diagram illustrating various components of an example control system, according to one embodiment.

FIG. 7 is a block diagram illustrating various components of an example control system 130, according to one embodiment. Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 7. In the illustrated implementation, a control system 130 includes one or more processors 710A through 710N, coupled to a non-transitory computer-readable storage medium 720 via an input/output (I/O) interface 730. The control system 130 further includes a network interface 740 coupled to the I/O interface 730, and one or more input/output devices 750. In some implementations, it is contemplated that a described implementation may be implemented using a single instance of the control system 130 while, in other implementations, multiple such systems or multiple nodes making up the control system 130 may be configured to host different portions or instances of the described implementations. For example, in one implementation, some data sources or services (e.g., related to portions of vacuum-actuated object grasping systems, operations, or processes, etc.) may be implemented via one or more nodes of the control system 130 that are distinct from those nodes implementing other data sources or services (e.g., related to other portions of vacuum-actuated object grasping systems, operations, or processes, etc.).

In various implementations, the control system 130 may be a uniprocessor system including one processor 710A, or a multiprocessor system including several processors 710A-N (e.g., two, four, eight, or another suitable number). The processors 710A-N may be any suitable processor capable of executing instructions. For example, in various implementations, the processors 710A-N may be general-purpose or embedded processors implementing any of a variety of instruction set architectures (ISAs). In multiprocessor systems, each of the processors 710A-N may implement the same ISA but this is not a requirement.

The non-transitory computer-readable storage medium 720 may store executable instructions and/or data accessible by the one or more processors 710A-N. In various implementations, the non-transitory computer-readable storage medium 720 may be implemented using any suitable memory technology, volatile memory elements, nonvolatile memory elements or combinations thereof. In the illustrated implementation, program instructions and data implementing desired functions and/or processes, such as those described above, are shown stored within the non-transitory computer-readable storage medium 720 as program instructions 725 and data storage 735, respectively. In other implementations, program instructions and/or data may be received, sent or stored upon different types of computer accessible media, such as non-transitory media, or on similar media separate from the non-transitory computer-readable storage medium 720 or the control system 130. Generally speaking, a non-transitory, computer-readable storage medium may include storage media or memory media such as magnetic or optical media, e.g., disk or CD/DVD-ROM, coupled to the control system 130 via the I/O interface 730. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 740.

In one implementation, the I/O interface 730 may coordinate I/O traffic between the processors 710A-N, the non-transitory computer-readable storage medium 720, and any peripheral devices, including the network interface 740 or other peripheral interfaces, such as I/O devices 750. In some implementations, the I/O interface 730 may perform any necessary protocol, timing, or other data transformations to convert data signals from one component (e.g., non-transitory computer-readable storage medium 720) into a format suitable for use by another component (e.g., processors 710A-B). In some implementations, the I/O interface 730 may include support for devices attached through various types of peripheral buses, such as a variant of the Peripheral Component Interconnect (PCI) bus standard or the Universal Serial Bus (USB) standard, for example. In some implementations, the function of the I/O interface 730 may be split into two or more separate components, such as a north bridge and a south bridge, for example. Also, in some implementations, some or all of the functionality of the I/O interface 1 130, such as an interface to the non-transitory computer-readable storage medium 720, may be incorporated directly into the processors 710A-N.

The network interface 740 may be configured to allow data to be exchanged between the control system 130 and other devices attached to a network, such as other control systems, material handling system controllers, warehouse management systems, other computer systems, robotic arms (e.g., the robotic arm 105 illustrated in FIG. 1), machines, or systems, object grasping apparatus, machines, or systems (and components thereof), various types of sensors, various types of vision systems, imaging devices, or imaging sensors, upstream stations or processes, downstream stations or processes, other material handling systems or equipment, or between nodes of the control system 130. In various implementations, the network interface 740 may support communication via wired or wireless general data networks, such as any suitable type of Ethernet network.

I/O devices 750 may, in some implementations, include one or more displays, projection devices, visual input/output devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 130. Multiple input/output devices 750 may be present in the control system 130 or may be distributed on various nodes of the control system 130. In some implementations, similar input/output devices may be separate from the control system 130 and may interact with one or more nodes of the control system 130 through a wired or wireless connection, such as over the network interface 740.

As shown in FIG. 7, the medium 720 may include program instructions 725 that may implement one or more of the described implementations and/or provide data storage 735, which may comprise various tables, data stores and/or other data structures accessible by the program instructions 725. The program instructions 725 may include various executable instructions, programs, or applications to facilitate vacuum-actuated object grasping operations and processes described herein, such as movement device or robotic arm, machine, or apparatus controllers, drivers, or applications, vacuum or negative pressure source controllers, drivers, or applications, object grasping apparatus end of arm tool controllers, drivers, or applications, actuator controllers, drivers, or applications, sensor controllers, drivers, or applications, sensor data processing applications, vision system or imaging device controllers, drivers, or applications, imaging data processing applications, material handling equipment controllers, drivers, or applications, upstream station controllers, drivers, or applications, downstream station controllers, drivers, or applications, etc. The data storage 735 may include various data stores for maintaining data related to systems, operations, or processes described herein, such as movement devices, robotic arms, machines, or apparatus, vacuum or negative pressure sources or lines, object grasping apparatus end of arm tools, actuators, sensors, sensor data, vision systems or imaging devices, imaging data, objects, object data, material handling equipment or apparatus, upstream systems, stations, or processes, downstream systems, stations, or processes, etc.

Those skilled in the art will appreciate that the control system 130 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 130 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An end effector comprising:
first and second plates disposed parallel to each other; and
an extendable suction cup disposed between the first and second plates, wherein:
the extendable suction cup is configured to:
pneumatically extend to contact a target item within a container;
create a seal with the target item; and
pneumatically retract to remove the target item from the container;
the end-effector is further configured to:
identify a first item adjacent to a first side of the target item and a second item adjacent to a second side of the target item;
move the first plate so that it is aligned with the first item;
move the second plate so that it is aligned with the second item; and
retract the extendable suction cup;
wherein the first plate and the second plate are configured to keep the first and second items fixed within the container while the extendable suction cup is retracted to remove the target item from the container.

2. The end effector of claim 1, wherein the extendable suction cup comprises:
a suction cup element;
a piston having a first end coupled to the suction cup element, having a second end coupled to a base, and comprising a first pressure inlet and a second pressure inlet, each configured to receive pressurized air; and
a shaft having a first end coupled to the suction cup element and having a second end coupled to a vacuum input.

3. The end effector of claim 2, wherein the extendable suction cup is pneumatically extended when pressurized air is received via the first pressure inlet causing the piston to extend in a direction away from the second end.

4. The end effector of claim 2, wherein the extendable suction cup is pneumatically retracted when pressurized air is received via the second pressure inlet causing the piston to retract in a direction towards the second end.

5. The end effector of claim 2, wherein the vacuum input is configured to connect to a vacuum source in order to create the vacuum.

6. The end effector of claim 2, wherein each of the first plate and the second plate is independently actuated via a separate motor.

7. The end effector of claim 2, wherein at least one of the first plate or the second plate is moved in relation to the other plate.

8. A method comprising:
identifying a target item to pick from a container using an end effector, the end effector comprising:
first and second plates disposed parallel to each other; and
an extendable suction cup disposed between the first and second plates;
extending the extendable suction cup towards the target item;
contacting the extendable suction cup with the target item;
creating a seal between the extendable suction cup and the target item;
after creating the seal, retracting the extendable suction cup to remove the target item from the container;
engaging the target item between the first and second plates, after retracting the extendable suction cup;
identifying a first item adjacent to a first side of the target item and a second item adjacent to a second side of the target item;
moving the first plate so that it is aligned with the first item;
moving the second plate so that it is aligned with the second item; and
retracting the extendable suction cup after the first plate is aligned with the first item and the second plate is aligned with the second item;
wherein the first plate and the second plate are configured to keep the first and second items fixed within the container while the extendable suction cup is retracted to remove the target item from the container.

9. The method of claim 8, wherein:
the extendable suction cup comprises:
a suction cup element; and
a piston having a first end coupled to the suction cup element and a second end coupled to a base, the piston further comprising a first pressure inlet configured to receive pressurized air; and
extending the extendable suction cup comprises receiving pressurized air through the first pressure inlet that extends the piston from the second end.

10. The method of claim 9, wherein contacting the extendable suction cup with the target item comprises contacting a surface of the target item with the suction cup element when the piston is extended.

11. The method of claim 9, wherein:
the extendable suction cup further comprises a shaft having a first end coupled to the suction cup element and a second end coupled to the base; and
creating the seal between the extendable suction cup and the target item comprises creating a vacuum within the shaft.

12. The method of claim 9, wherein:
the piston further comprises a second pressure inlet configured to receive pressurized air; and
retracting the extendable suction cup comprises receiving pressurized air through the second pressure inlet that retracts the piston in a direction towards the second end.

13. The method of claim 8, wherein engaging the target item between the first and second plates comprises independently actuating at least one of the first plate or the second plate.

* * * * *